United States Patent [19]
Asano et al.

[11] Patent Number: 6,054,083
[45] Date of Patent: *Apr. 25, 2000

[54] PROCESS FOR PREPARATION OF POLYTETRAFLUOROETHYLENE MOLDING POWDER

[75] Inventors: Michio Asano; Singo Tanigawa; Akira Shimodoh; Tetuo Shimizu; Shiouji Kawachi, all of Settsu, Japan

[73] Assignee: Daikin Industries, Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/913,355
[22] PCT Filed: Mar. 14, 1996
[86] PCT No.: PCT/JP96/00687
§ 371 Date: Sep. 12, 1997
§ 102(e) Date: Sep. 12, 1997
[87] PCT Pub. No.: WO96/28498
PCT Pub. Date: Sep. 19, 1996

[30] Foreign Application Priority Data

Mar. 15, 1995 [JP] Japan ....................................... 7-95812

[51] Int. Cl.[7] ......................................................... B29B 9/08
[52] U.S. Cl. ........................... 264/117; 264/140; 264/233
[58] Field of Search ................................. 264/117, 140, 264/233

[56] References Cited

U.S. PATENT DOCUMENTS 3,115,486 12/1963 Weisenberger .
3,690,569 9/1972 Leverett ...................................... 241/17
3,781,258 12/1973 Kometani et al. ....................... 528/499
3,953,412 4/1976 Saito et al. ............................... 526/247
4,241,137 12/1980 Izumo et al. ......................... 264/117 X

FOREIGN PATENT DOCUMENTS 52-38857B 10/1977 Japan .
60-240713A 11/1985 Japan .
1-8088B2 4/1989 Japan .
3-259925A 11/1991 Japan .
3-259926A 11/1991 Japan .
4-20534A 1/1992 Japan .
4-202329A 7/1992 Japan .

OTHER PUBLICATIONS

"Rubber•Plastic Working Machine (Add.) Control Equipment•Reproducer" (Japan) Rubber Digest, Ltd. (1976) p. 400.

*Primary Examiner*—Leo B. Tentoni
*Attorney, Agent, or Firm*—Kubovcik & Kubovcik

[57] ABSTRACT

A preparation process in which PTFE coarse particles are finely pulverized into particles in wet state, thus enabling the finely pulverized particles to be washed as they are and an amount of impurities to be decreased efficiently and after the washing, agglomeration granulation is carried out, thus enabling PTFE molding powder to be obtained in the reduced number of steps; a preparation process of a polytetrafluoroethylene molding powder, characterized in that polytetrafluoroethylene coarse particles obtained by suspension polymerization of tetrafluoroethylene are finely pulverized, in wet state, into an average particle size particularly in a range of 10 to 100 $\mu$m and then washed; and a preparation process of a polytetrafluoroethylene molding powder, characterized in that after the washing, mechanical force is applied to the washed powder in wet state for agglomeration granulation, thus giving particles having an average particle size in a range of 200 to 800 $\mu$m.

22 Claims, 1 Drawing Sheet

PROCESS FOR PREPARATION OF POLYTETRAFLUOROETHYLENE MOLDING POWDER

TECHNICAL FIELD

The present invention relates to a process for preparing a polytetrafluoroethylene molding powder usable for compression molding.

BACKGROUND ART

Polytetrafluoroethylene (hereinafter referred to as "PTFE") powders used generally are roughly classified into two kinds of powders, namely a powder for molding obtained by aqueous suspension polymerization substantially in the absence of emulsifying agent (so-called "molding powder") used mainly for compression molding and ram extrusion molding and a powder obtained by emulsion polymerization in the presence of emulsifying agent and so-called "fine powder" used mainly for paste extrusion molding. The latter emulsion-polymerized fine powder can be used for molding as it is without being pulverized since it is a fine particle. To the contrary, the former molding powder is finely pulverized and used as a powder for molding since coarse particles obtained by aqueous suspension polymerization usually has a large particle size of several millimeters.

Among those powders, the present invention relates to the former molding powder, namely PTFE molding powder obtained by aqueous suspension polymerization. The PTFE molding powder has been prepared, in general, through the following steps.

Step (1): PTFE coarse particles having a particle size of several millimeters are prepared by aqueous suspension polymerization of tetrafluoroethylene.

Step (2): The obtained PTFE coarse particles are pulverized in water medium to give roughly pulverized PTFE particles having a particle size exceeding about 100 μm.

Step (3): The resulting roughly pulverized PTFE particles are washed in a washing tank.

Step (4): Then the washed roughly pulverized PTFE particles are dried.

Step (5): Lastly the dried roughly pulverized PTFE particles are finely pulverized into fine particles having a particle size of not more than 100 μm, particularly not more than 50 μm, thereby a PTFE molding powder is produced.

However, in the above-mentioned process, a small amount of impurities such as a residual monomer or catalyst contained in the roughly pulverized PTFE particles cannot be removed efficiently through the washing of the step (3). This is presumed to be one of factors for endowing the resulting PTFE molding powder with an adverse effect on physical properties. For that reason, there are proposed attempts of increasing washing efficiency by increasing the number of washing steps or by changing washing conditions such as temperature and rotation speed. However the particle size of the roughly pulverized particles usually exceeds about 100 μm and is still large. Therefore, even by such attempts, it is difficult to remove the impurities from the particles sufficiently. Though such a problem with respect to the washing may be improved by re-washing after the fine pulverization of the step (5) and then drying, it results in two drying steps and is not allowable in view of efficient process steps.

Also in order to give a high apparent specific gravity and excellent flowability to the PTFE molding powder obtained by aqueous suspension-polymerization and then fine pulverization, there is also known an agglomeration-granulation process. The agglomeration-granulated powder is available as a molding powder suitable for automatic molding process from the viewpoint of its good flowability. The granular powder through agglomeration is prepared in general by the following steps.

Step (6): Mechanical force such as stirring is applied to the PTFE molding powder obtained in the step (5), in the presence or absence of water in the presence of an organic liquid being capable of wetting PTFE, thus executing agglomeration granulation of the PTFE molding powder.

Step (7): The agglomeration-granulated PTFE molding powder is dried. An average particle size of the agglomeration-granulated powder is usually not less than about 100 μm.

In the step (6), there are known that mechanical force such as stirring is applied in the presence of water or in the absence of water. Though either of them can be employed, when the force is applied in the presence of water, controlling of the step is easier, a powder having uniform particle size can easily be obtained and it is advantageous for automation of the step. Thus many industrial processes employ the agglomeration-granulation process in the presence of water.

However, in case of the presence of water, since the powder dried in the step (4) is wetted in the step (6) and then dried again (in the step (7)), the number of steps increases and as a result, cost becomes high.

An object of the present invention is to provide a process for preparing a PTFE molding powder which is capable of decreasing efficiently an amount of impurities remaining therein.

Another object of the present invention is to provide a process for preparing an agglomeration-granulated PTFE molding powder with decreased number of steps.

DISCLOSURE OF THE INVENTION

The present invention relates to a process for preparing a PTFE molding powder, characterized in that PTFE coarse particles obtained by suspension polymerization of tetrafluoroethylene are finely pulverized in wet state and then washed.

The present invention also relates to a process for preparing a PTFE molding powder, characterized in that PTFE coarse particles obtained by suspension polymerization of tetrafluoroethylene are finely pulverized in wet state into particles having an average particle size ranging from 10 to 100 μm, particularly 20 to 50 μm and then washed.

Further the present invention relates to a process for preparing a PTFE molding powder, characterized in that PTFE coarse particles obtained by suspension polymerization of tetrafluoroethylene are finely pulverized in wet state, washed and then granulated through agglomeration.

In the present invention, it is preferable that pulverization into an average particle size of 10 to 100 μm (hereinafter referred to as "fine pulverization") is conducted with a pulverizing machine having such a structure that pulverization is carried out by impact force. A preferred impact-pulverizing machine is one which comprises a pulverization chamber having a rotating hammer therein, means to continuously supply a powder to the pulverization chamber and a perforated plate surrounding the chamber and arranged to cover at least in the peripheral direction of the rotating hammer and has such a mechanical system that when particles pulverized by impact force in the chamber are scattered outward with centrifugal force, the desired particles having a given size are classified through the perforated plate. It is preferable that in the present invention, fine pulverization is carried out continuously with such a pulverizing machine.

BEST MODE FOR CARRYING OUT THE INVENTION

Figure 1:
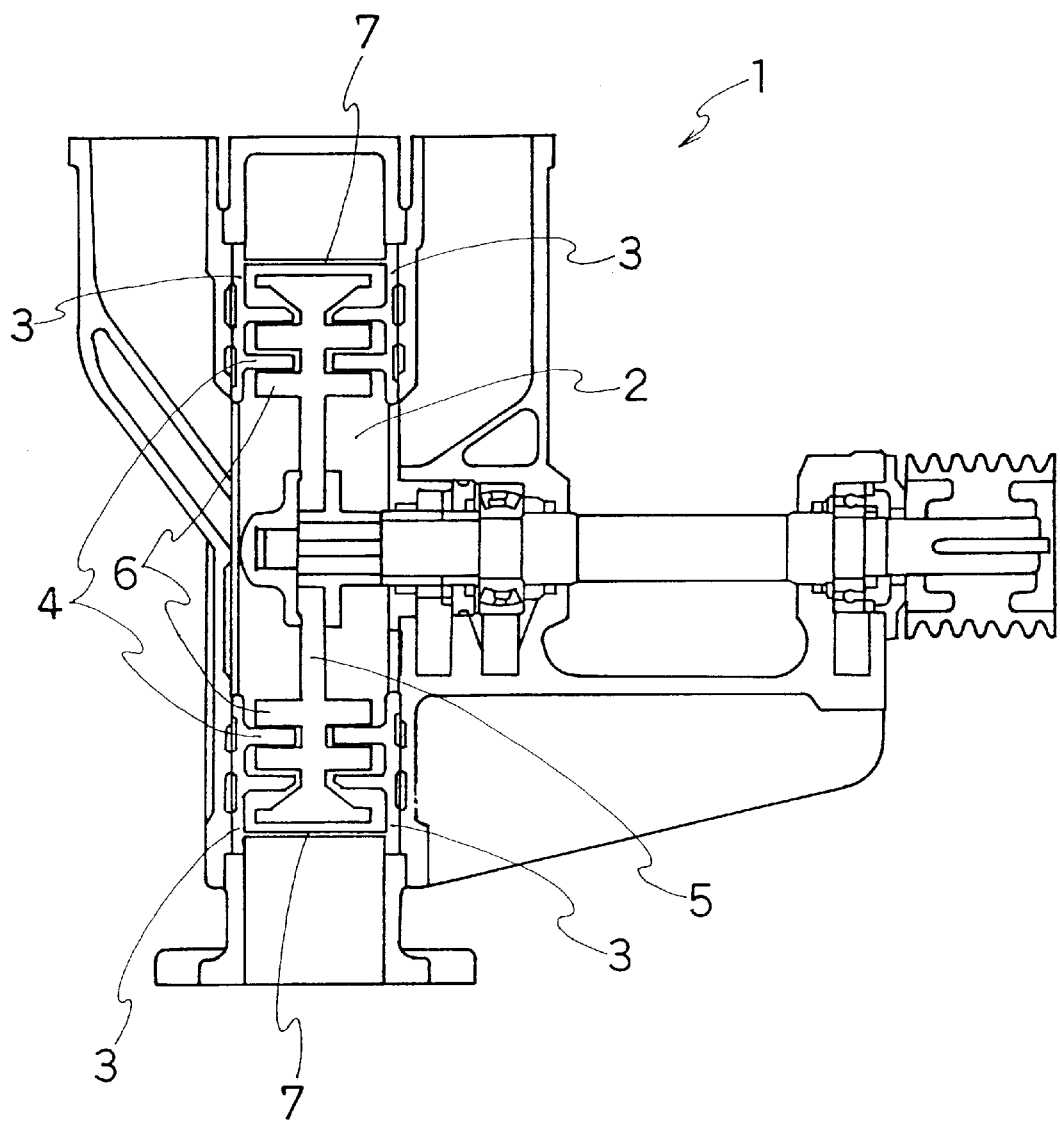
FIG. 1 is a diagrammatical sectional view of a pulverizing machine "JIYU mill" used in the present invention.

The PTFE coarse particles, which are a starting material in the present invention and are obtained by the aqueous suspension polymerization, have a particle size of about 1 mm to about 5 mm usually and are prepared by usual suspension polymerization in aqueous medium by using radical polymerization initiator. In that case, water is usually used as the aqueous medium. Examples of the radical polymerization initiator are, for instance, persulfates such as ammonium persulfate and potassium persulfate; peroxides such as hydrogen peroxide and di(perchlorofluoroacyl) peroxide, various redox initiators and the like. Among them, ammonium persulfate and potassium persulfate are preferred from the viewpoints of yield, coloring and handling property.

In the process of the present invention, the PTFE coarse particles which are a starting material are those obtained by the above-mentioned suspension polymerization of tetrafluoroethylene alone or tetrafluoroethylene and a compound copolymerizable therewith. As the compound copolymerizable with tetrafluoroethylene, vinyl ether monomer represented by the formula (I):

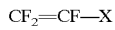

$$CF_2=CF-X$$

wherein X is $OR_f$, $R_f$ is a polyfluoroalkyl group having 1 to 5 carbon atoms (hereinafter referred to as "compound (I)") is preferred, and perfluoro(propyl vinyl ether) is particularly preferred. An amount of recurring unit derived from the compound (I) in the obtained tetrafluoroethylene copolymer is preferably from 0.001 to 0.2% by mole, more preferably from 0.004 to 0.072% by mole.

In the present invention, the PTFE coarse particles are pulverized into fine particles preferably having an average particle size of 10 to 100 μm, more preferably 20 to 50 μm, in a wet state, namely in the presence of a liquid without carrying out the conventional drying step before the fine pulverization. The fine pulverization may be carried out by single-stage pulverization from the PTFE coarse particles having a particle size of about 1 mm to about 5 mm to fine particles having a particle size of 10 to 100 μm. It is preferable, from the viewpoint of feeding of the coarse particles after the polymerization, to employ a two-stage pulverization method such that the PTFE coarse particles are once roughly pulverized into particles having a particle size of of about 200 μm to about 1,000 μm and then the fine pulverization is carried out. This is because when the PTFE coarse particles having a particle size of 1 to 5 mm are fed as they are, there is a possibility of clogging a pipe to the wet fine pulverization step.

The meaning of "in a wet state at the time of the fine pulverization" namely "in the presence of a liquid without carrying out the drying step" is such that the surfaces of the PTFE coarse particles may be in the state of being wet with a liquid such as water or that the PTFE coarse particles may exist in the state of a slurry or in the state of a dispersion in a relatively large amount of a liquid. However in order to decrease power for pulverization, it is not preferable in general that a large amount of liquid exists. The wet state is in general a state of containing not less than 1% by weight of water on the basis of the PTFE coarse particles, and usually fine particles containing 2 to 80% by weight of water are used. Therefore, it is preferable that the fine pulverization is carried out in the state of being wet with water after sieving the PTFE coarse particles and draining water or, more preferably, as mentioned above, after further pulverizing the PTFE coarse particles into the roughly pulverized particles having an average particle size of about 200 μm to about 1,000 μm, sieving and then roughly draining.

The fine pulverization in the present invention is carried out by employing a wet type pulverizing machine which pulverizes with an impact force. Though there are known various pulverizing machines of that type, it is preferable in the present invention that at the same time of the fine pulverization, only fine particles pulverized into a desired particle size can be taken out continuously. For that purpose, it is preferable that when the pulverizing machine is selected from those of such a type as applying impact force with a hammer, a peripheral speed of the hammer is as large as possible.

One of pulverizing machines satisfying such conditions is, for example, "JIYU mill" available from Nara Kikai Seisakusho Kabushiki Kaisha. FIG. 1 is a diagrammatical sectional view for explaining the JIYU mill. In FIG. 1, numeral 1 represents JIYU mill, numeral 2 represents a pulverization chamber, numeral 3 represents a side wall, numeral 4 represents a rod-like projection provided on the side wall, numeral 5 represents a disk-like rotor, numeral 6 represents a rod-like projection provided on the rotor and numeral 7 represents a perforated plate. The pulverizing machine 1 has such a structure that the pulverization chamber 2 is in a flat cylindrical shape; a plurality of rod-like projections 4 having a rectangular or elliptical section are provided on the two facing side walls 3 of the chamber; the rotating disk-like rotor 5 is set in parallel with surfaces of the two side walls 3 in the center of the pulverization chamber 2; and a plurality of rod-like projections 6 are provided on both top and bottom faces of the rotor 5 so as not to collide with the rod-like projections 4 on the side walls 3 when the rotor 5 rotates.

The PTFE coarse particles are supplied into the center of the pulverizing machine 1, are blown off toward the peripheral direction by centrifugal force of the rotating rotor 5 and collide with the side walls 3 and the rod-like projections 6 on the rotor 5, thus being pulverized with impact force. On the periphery of the rotation direction of the rotor 5 in the pulverization chamber 2 is provided a perforated plate having a ring form. Only particles pulverized into a size smaller than the diameter of through-holes of the perforated plate 7 pass through the holes and are taken outside the plate 7. As the perforated plate 7, there may be used a net made of metal or the like and various other ones such as a thin metal sheet having plural through-holes drilled thereon. A size of the obtained particles changes depending on the diameter of the hole. The smaller the diameter is, the smaller the particle size is. When the particles are wetted, for example, with water, the size of particles actually taken out is considerably smaller than the diameter of the holes of the perforated plate 7.

It is presumed that one of the reasons why JIYU MILL is capable of fine pulverization even if the PTFE coarse particles are in a wet state is such that high speed rotation of the rotor 5, for example, about 100 m/s of peripheral speed can be obtained.

Examples of a hammer type pulverizing machine which can provide a peripheral speed equal to or higher than that of JIYU mill are, for instance, "Coloplex" and "Contraplex" available from Hosokawa Micron Kabushiki Kaisha, "Fine Mill" available from Nippon Pneumatic Kabushiki Kaisha and the like. Each is suitable for pulverization under dry condition. If those machines are used in coexistence with, for example, water, the peripheral speed is lowered, and since pneumatic classification is employed as classifying mechanism, when the pulverized particles are wet, there arises a phenomenon that pneumatic classification cannot function and particles having a size larger than desired are classified and discharged. Also basically as a wet type pulverizing machine, there are shearing mills such as a colloid mill and grinding machine. However, those pulverizing machines cannot be employed because finely pulverized PTFE particles are deformed due to an extreme shearing force.

Subsequently, the thus obtained PTFE finely pulverized particles are washed with water and then dried. It is preferable to wash in a washing tank with deionized water of 10° to 100° C. The fine particles having an average particle size of 10 to 100 $\mu$m are dried until a water content thereof becomes not more than 0.005% by weight, more preferably not more than 0.002% by weight.

The roughly pulverized PTFE particles have been washed in the conventional process. However, as mentioned above, by washing after the fine pulverization, an area of finely pulverized particles contacting the deionized water becomes larger and an amount of impurities can be reduced efficiently. If the washing is insufficient, there arises, in a baking step for obtaining a PTFE molded article, a problem with respect to coloring inside the molded article. This problem, however, can be solved by the washing method of the present invention.

The agglomeration granulation of the present invention is carried out by applying mechanical force such as stirring in the presence of an organic liquid being capable of wetting the PTFE particles in the presence or absence of water after washing of the PTFE finely pulverized particles pulverized through the method mentioned above. Examples of the organic liquid which can be used in that case are liquids substantially insoluble in water, for instance, aliphatic hydrocarbons such as hexane, heptane, gasoline, kerosene and a mixture thereof; aromatic hydrocarbons such as benzene, toluene and xylene; chlorine-containing compounds or bromine-containing compounds such as trichloroethylene, carbon tetrachloride, allyl ionide, ethylene dibromide, chloral, dichloroacetic acid, monochlorobenzene and benzyl chloride; fluorine-containing compounds such as octafluorocyclobutane, $CF_2CH_2CF_2H$, $Cl(CF_2CFCl)_nCl$ wherein n is an integer of 1 to 5, omegamonohydroperfluorohexene, and a mixture thereof; a mixture of those organic liquids; and the like.

In the agglomeration granulation which is widely adopted, the organic liquid is added to the PTFE molding powder and the mixture is stirred in an agitation tank as it is or by adding water thereto. An amount of the organic liquid is a sufficient amount for wetting completely the PTFE molding powder. The adding amount larger than that is not preferable from economical point of view. On the contrary, if the amount is insufficient, particulate granulates cannot be obtained in the following granulation step. However, if the PTFE molding powder is in the state of being wet completely, there is no problem with respect to whether the liquid amount is higher or lower somewhat. The adding amount of the organic liquid is in general not less than 5% by weight on the basis of the PTFE molding powder, preferably not less than 10% by weight. A stirring temperature can be selected optionally and is preferably in the range of 30° to 150° C. It is preferable to determine the stirring temperature mainly depending on a boiling point of the organic liquid to be used. There is known that a granulated powder having good flowability can be obtained by employing a relatively high temperature in case of an organic liquid having a high boiling point and a relatively low temperature in case of an organic liquid having a low boiling point and by stirring with removing the organic liquid through evaporation. Methods of granulating the PTFE molding powders are disclosed in detail in, for example, JP-B-44-22619, JP-B-44-22620, JP-B-45-9071, etc. The granulation in the present invention can be carried out properly in reference thereto.

In the preparation process of the present invention, when water is used for granulation, the PTFE finely pulverized particles after the fine pulverization are put in a vessel to be washed, and immediately after the washing, can be granulated in the same vessel. Then by drying after the granulation, the PTFE molding powder granulated through agglomeration and having an average particle size of 200 to 800 $\mu$m in wet sieve size can be obtained.

There is widely used a PTFE molding powder in which various inorganic fillers or organic fillers are incorporated for the purposes to improve properties such as abrasion resistance and creep resistance. In the preparation process of the present invention, as mentioned above, the fillers can be mixed in the washing step after the PTFE coarse particles are finely pulverized into particles having an average particle size in the range of 10 to 100 $\mu$m, or in the drying step following the washing step. As the fillers, there can be cited, for example, powders of inorganic materials such as glass powder, glass fiber powder, carbon powder, graphite powder, copper powder, molybdenum disulfide powder, bronze powder, mica powder and alumina powder, particularly such inorganic powders subjected to hydrophobilization with a silane compound or the like; heat resistive high molecular compound powders such as polyether sulfone powder, polyether ester powder and polyphenylene sulfide powder; further fluorine-containing high molecular compound powders such as tetrafluoroethylene-hexafluoropropylene copolymer and melt-moldable tetrafluoroethylene-perfluoro(alkyl vinyl ether) copolymer; and the like.

In this specification, the "average particle size" of the PTFE finely pulverized particles after the fine pulverization (average particle size: 10 to 100 $\mu$m) means an average particle size measured by a wet sieve size method. Namely, there are used JIS standard sieves of 20 mesh (opening of sieve: 840 $\mu$m), 250 mesh (opening of sieve: 62 $\mu$m), 270 mesh (opening of sieve: 53 $\mu$m), 325 mesh (opening of sieve: 44 $\mu$m) and 400 mesh (opening of sieve: 37 $\mu$m). First the 20 mesh sieve is placed on the 250 mesh sieve. A sample powder of 5 g is put on the 20 mesh sieve. Then carbon tetrachloride is sprayed to the powder at a rate of about 3 liters/m$^2$ for about 30 seconds by using a shower sprayer to wash down the powder onto the lower sieve with care. After the sample powder is washed down completely, the upper sieve is removed and spraying to the lower sieve is carried out thoroughly for about four minutes. Then the lower sieve is air-dried and a weight of the dried powder remaining on the sieve is measured. The same procedures are repeated by using the 20 mesh sieve and each of other three small mesh sieves and using 5 g of new sample powder, respectively. In order to obtain accumulative weight percentage, the weights of the powders collected on each sieve are multiplied by 20, and then the obtained values are plotted on a logarithmic probability paper with respect to each opening of the sieves. The plotted points are connected with a line. Then the particle sizes corresponding to the accumulative percentages 50($d_{50}$) and 84($d_{34}$) are read and wet sieve size ($d_{ws}$) is calculated by the following equation:

$$log_e d_{ws} = log_e d_{50} - \tfrac{1}{2}(log_e d_{34}/d_{50})^2$$

Also in this specification, "average particle sizes" of the particles other than the finely pulverized PTFE powder, for example, particles in the PTFE molding powder granulated through agglomeration, PTFE coarse particles after polymerization and roughly pulverized PTFE particles obtained by further pulverizing the PTFE coarse particles after polymerization (any of those particles have an average particle size exceeding 100 µm) are values obtained by a particle size distribution measuring method employing a shaking machine as mentioned below. In that measuring method, sieves are piled up from the top in order of JIS standard sieve of 10 mesh (opening of sieve: 1,680 µm), 20 mesh (opening of sieve: 840 µm), 32 mesh (opening of sieve: 500 µm), 48 mesh (opening of sieve: 297 µm) and 60 mesh (opening of sieve: 250 µm). Then each particle mentioned above is placed on the 10 mesh sieve and the sieves are shaken to drop smaller particles downward in order. After calculating percentage (%) of particles remaining on each sieve, accumulative percentage values (ordinate) of the ratio of the remaining particles are plotted for openings of each sieve (abscissa) on the logarithmic probability paper. Those plotted points are connected with a line, and a particle size amounting to 50% on the line is obtained and assumed to be an average particle size of each particle.

The present invention is explained by means of examples, and the present invention is not limited to them.

REFERENCE EXAMPLE 1

Preparation of PTFE

A 2,000-liter stainless steel autoclave equipped with a stirrer is charged with 1,600 liters of deoxidated deionized water, and the inside air is replaced with nitrogen gas and then with tetrafluoroethylene. Afterwards, with maintaining the inside temperature at 10° C., tetrafluoroethylene is fed under pressure until the inside pressure becomes 6 atm, and $(NH_4)_2S_2O_8$ and $Fe_2SO_4$ are added as polymerization initiators to polymerize tetrafluoroethylene with stirring. Since the pressure decreases with advance of the polymerization, tetrafluoroethylene is added continuously to keep the inside pressure at 6 atm. After a lapse of four hours, the stirring is stopped, and after unreacted tetrafluoroethylene is recovered, a product in the autoclave is taken out. Produced PTFE coarse particles having an average particle size of 2 to 3 mm are roughly pulverized with a T.K. Pipe Line Homomixer Model 2S (available from Tokushu Kika Kogyo Kabushiki Kaisha) into roughly pulverized PTFE particles having an average particle size of about 400 µm.

REFERENCE EXAMPLES 2 TO 4

Preparation of PTFE

Polymerization of tetrafluoroethylene is carried out in the same manner as in Reference Example 1 except that the polymerization conditions are changed to those shown in Table 1, to prepare roughly pulverized PTFE particles in the same manner as in Reference Example 1. In Reference Examples 3 and 4, as shown in Table 1, perfluoro(propyl vinyl ether) is mixed as a modifier to tetrafluoroethylene.

Table 1 shows the polymerization conditions and average particle sizes of PTFE coarse particles and roughly pulverized PTFE particles of Reference Examples 1 to 4.

TABLE 1

| | Polymerization Conditions | | | | | Average particle size of PTFE coarse particles (mm) (Coarse particle No.) | Average particle size of roughly pulverized PTFE particles (µm) (Roughly pulverized particle No.) |
|---|---|---|---|---|---|---|---|
| | Pressure (kg/cm$^2$) | Temperature (°C.) | Amount of water (liter) | Amount of modifier[1] (% by mole) | Polymerization time (hour) | | |
| Ref. Ex. 1 | 5–6 | 10 | 1600 | None | 4 | 2–3 (No. 1) | 400 (No. 1) |
| Ref. Ex. 2 | 3–4 | 70 | 1600 | None | 5 | 5–7 (No. 2) | 900 (No. 2) |
| Ref. Ex. 3 | 7–8 | 50 | 1600 | 0.036 | 6 | 1–2 (No. 3) | 300 (No. 3) |
| Ref. Ex. 4 | 7–8 | 70 | 1600 | 0.036 | 4 | 1–2 (No. 4) | 300 (No. 4) |

[1]As a modifier, perfluoro(propyl vinyl ether) was used.

EXAMPLE 1

JIYU mill Model M-2 (available from Nara Kikai Seisakusho Kabushiki Kaisha) was charged with the roughly pulverized PTFE particles prepared in Reference Example 1 which contained about 25% by weight of water without being dried, followed by wet-pulverizing. As the perforated plate for classification of particles, a screen having a number of through-holes of 0.25 mm diameter was used. The particles were finely pulverized at a power of 2.2 kW at a pulverizing rate of 38 kg/hour.

A 200-liter stainless steel washing tank equipped with a stirrer was charged with 130 liters of water and 30 kg of the thus obtained finely pulverized PTFE particles having a water content of 10% by weight. The rotation speed of the stirrer was set at 400 rpm and the inside temperature of the tank was elevated to be not less than 90° C., followed by stirring and washing for one hour with the inside of the tank being kept at a temperature of not less than 90° C. Afterwards, only water was discharged and again 130 liters of water was charged. Then the same washing as mentioned above was repeated twice, and thus hot water washing was carried out three times in total. The finely pulverized PTFE particles were then dried at 160° C. for 16 hours in an electric oven. An average particle size of the thus obtained PTFE molding powder was 50 μm.

EXAMPLE 2

JIYU mill Model M-2 was charged with the roughly pulverized PTFE particles prepared in Reference Example 1 which contained about 25% by weight of water without being dried, followed by wet-pulverizing. As the perforated plate for classification of particles, a screen having a number of through-holes of 0.10 mm diameter was used. The particles were finely pulverized at a power of 2.2 kW at a pulverizing rate of 6 kg/hour. The obtained pulverized PTFE fine particles were washed and dried in the same manner and under the same conditions as in Example 1. An average particle size of the thus obtained PTFE molding powder was 31 μm.

EXAMPLE 3

JIYU mill Model M-2 was charged with the roughly pulverized PTFE particles prepared in Reference Example 2 which contained about 10% by weight of water without being dried, followed by wet-pulverizing. As the perforated plate for classification of particles, a screen having a number of through-holes of 0.20 mm diameter was used. The particles were finely pulverized at a power of 2.2 kW at a pulverizing rate of 4.5 kg/hour. The obtained pulverized PTFE fine particles were washed and dried in the same manner and under the same conditions as in Example 1. An average particle size of the thus obtained PTFE molding powder was 36 μm.

EXAMPLE 4

JIYU mill Model M-2 was charged with the roughly pulverized PTFE particles prepared in Reference Example 2 which contained about 10% by weight of water without being dried, followed by wet-pulverizing. As the perforated plate for classification of particles, a screen having a number of through-holes of 0.10 mm diameter was used. The particles were finely pulverized at a power of 2.2 kW at a pulverizing rate of 1.2 kg/hour. The obtained pulverized PTFE fine particles were washed and dried in the same manner and under the same conditions as in Example 1. An average particle size of the thus obtained PTFE molding powder was 16 μm.

EXAMPLE 5

JIYU mill Model M-2 was charged with the roughly pulverized PTFE particles prepared in Reference Example 3 which contained about 20% by weight of water without being dried, followed by wet-pulverizing. As the perforated plate for classification of particles, a screen having a number of through-holes of 0.20 mm diameter was used. The particles were finely pulverized at a power of 2.2 kW at a pulverizing rate of 20 kg/hour. The obtained pulverized PTFE fine particles were washed and dried in the same manner and under the same conditions as in Example 1. An average particle size of the thus obtained PTFE molding powder was 41 μm. A content (remaining amount) of a modifier monomer (perfluoro(propyl vinyl ether)) in the obtained PTFE molding powder was analyzed by head space gas chromatography. The content was 0.7 ppm.

EXAMPLE 6

JIYU mill Model M-2 was charged with the roughly pulverized PTFE particles prepared in Reference Example 4 which contained about 15% by weight of water without being dried, followed by wet-pulverizing. As the perforated plate for classification of particles, a screen having a number of through-holes of 0.20 mm diameter was used. The particles were finely pulverized at a power of 2.2 kW at a pulverizing rate of 28 kg/hour. The obtained pulverized PTFE fine particles were washed and dried in the same manner and under the same conditions as in Example 1. An average particle size of the thus obtained PTFE molding powder was 43 μm.

Fine pulverization conditions and average particle sizes after the fine pulverization of Examples 1 to 6 are all shown in Table 2.

TABLE 2

| | Roughly pulverized PTFE particles | | Fine pulverization conditions | | | | | Average particle size after fine pulverization (μm) |
|---|---|---|---|---|---|---|---|---|
| | Roughly pulverized particle No. | Water content (% by weight) | Peripheral speed of rotor (m/s) | Power (kW) | Pulverizing rate (kg/hour) | Fine pulverization temperature (° C.) | Diameter of holes of screen (mm) | |
| Ex. 1 | No. 1 | 25 | 95 | 2.2 | 38 | 25 | 0.25 | 50 |
| Ex. 2 | No. 1 | 25 | 95 | 2.2 | 6 | 25 | 0.10 | 31 |
| Ex. 3 | No. 2 | 10 | 95 | 2.2 | 4.5 | 25 | 0.20 | 36 |
| Ex. 4 | No. 2 | 10 | 95 | 2.2 | 1.2 | 25 | 0.10 | 16 |
| Ex. 5 | No. 3 | 20 | 95 | 2.2 | 20 | 25 | 0.20 | 41 |
| Ex. 6 | No. 4 | 15 | 95 | 2.2 | 28 | 25 | 0.20 | 43 |

COMPARATIVE EXAMPLE 1

The roughly pulverized PTFE particles (No. 3) prepared in Reference Example 3 which contained 80% by weight of water were washed and dried in the same manner and under the same conditions as in Example 1 (it was confirmed that the water content was not more than 0.005% by weight). An average particle size of the thus obtained roughly pulverized PTFE particles was 350 μm.

Afterwards, the roughly pulverized PTFE particles were finely dry-pulverized into particles at 1,000 rpm with Rotor Speed Mill ZM-1 (available from Kabushiki Kaisha Nippon Seiki Seisakusho) to give a PTFE molding powder having an average particle size of 40 μm.

A content (remaining amount) of the modifier monomer (perfluoro(propyl vinyl ether)) in the obtained PTFE molding powder was analyzed by head space gas chromatography. The content was 8 ppm.

COMPARATIVE EXAMPLE 2

The roughly pulverized PTFE particles (No. 1) prepared in Reference Example 1 which contained 80% by weight of water were washed and dried in the same manner and under the same conditions as in Example 1. An average particle size of the thus obtained roughly pulverized PTFE particles was 400 μm.

The roughly pulverized PTFE particles were finely dry-pulverized into particles with Palpelyzer Model AP-44 (available from Hosokawa Micron Kabushiki Kaisha) under the conditions of a peripheral speed of 75 m/hour, a power of 53 kW and a pulverizing rate of 400 kg/hour to give a PTFE molding powder having an average particle size of 28 μm.

A 200-liter stainless steel granulation tank with a stirrer was charged with 130 liters of water and 30 kg of the PTFE molding powder. The rotation speed of the stirrer was set at 400 rpm and an inside temperature of the tank was adjusted to 25° to 30° C. Then the mixture was stirred for five minutes. Further 15 liters of 1,1,2-trichloro-1,2,2-trifluoroethane (CFC-113) was added thereto, followed by stirring for five minutes under the conditions mentioned above. Then a product in the granulation tank was subjected to 15-minute external circulation of being passed through a T.K. Pipe Line Homomixer Model 2SL and then returned to the granulation tank. During the external circulation of the rough pulverization, the stirring was continued. Then the stirring was carried out for 15 minutes under the above-mentioned temperature conditions for further shaping. After the shaping, the inside temperature of the tank was elevated to 45° C. over 20 minutes.

Then the product in the tank was taken out and dried in an electric oven at 165° C. for 16 hours. Physical properties of the PTFE molding powder so-obtained by the agglomeration granulation are shown in Table 3.

Each physical property shown in Table 3 is one measured according to the following methods. Physical properties of the PTFE molding powders obtained in Comparative Examples 3 to 5 and Examples 7 to 11 are those similarly measured according to the following methods.

Apparent specific gravity: Measured according to JIS K 6891.

Flowability of powder: Measured according to the measuring method of "Flowability of Powder" described in JP-B-3-259925.

Tensile strength/elongation: A die of 50 mm diameter was charged with 210 g of PTFE molding powders obtained by agglomeration granulation, and maintained at a molding pressure of 30 MPa for five minutes. The obtained pre-molded article was heated up to 365° C. at a temperature elevation rate of 50° C./hour and held at 365° C. for five hours, followed by cooling down to room temperature at a rate of 50° C./hour. The obtained PTFE molded article was cut to give a 0.5 mm thick tape. Measurements were made according to JIS K 6891 by using the obtained tape.

Electrostatic breakdown voltage: The molded article obtained in the same manner as that for Tensile strength/elongation measurements was cut to give a 0.1 mm thick tape. Measurements were made according to JIS K 6891.

COMPARATIVE EXAMPLE 3

The roughly pulverized PTFE particles (No. 2) prepared in Reference Example 2 which contained about 80% by weight of water were washed and dried in the same manner and under the same conditions as in Example 1. An average particle size of the thus obtained roughly pulverized PTFE particles was 900 μm.

The roughly pulverized PTFE particles were finely dry-pulverized into particles with Palpelyzer Model AP-44 under the conditions of a peripheral speed of 75 m/hour, a power of 36 kW and a pulverizing rate of 180 kg/hour to give a PTFE molding powder having an average particle size of 38 μm.

A 200-liter stainless steel granulation tank with a stirrer was charged with 130 liters of water and 30 kg of the PTFE molding powder. The rotation speed of the stirrer was set at 400 rpm and an inside temperature of the tank was adjusted to 25° to 30° C. Then the mixture was stirred for five minutes. Further 15 liters of 1,1,2-trichloro-1,2,2-trifluoroethane (CFC-113) was added thereto, followed by stirring for five minutes under the conditions mentioned above. Then a product in the granulation tank was subjected to 15-minute external circulation of being passed through a T.K. Pipe Line Homomixer Model 2SL and then returned to the granulation tank. During the external circulation of the rough pulverization, the stirring was continued. Then the stirring was carried out for 15 minutes under the above-mentioned temperature conditions for further shaping. After the shaping, the inside temperature of the tank was elevated to 45° C. over 20 minutes.

Then the product in the tank was taken out and dried in an electric oven at 165° C. for 16 hours. Physical properties of the PTFE molding powder so-obtained by the agglomeration granulation are shown in Table 3.

COMPARATIVE EXAMPLE 4

The roughly pulverized PTFE particles (No. 3) prepared in Reference Example 3 which contained about 80% by weight of water were washed and dried in the same manner and under the same conditions as in Example 1. An average particle size of the thus obtained roughly pulverized PTFE particles was 300 μm.

The roughly pulverized PTFE particles were finely dry-pulverized into particles with a Palpelyzer Model AP-44 under the conditions of a peripheral speed of 75 m/hour, a power of 35 kW and a pulverizing rate of 100 kg/hour to give a PTFE molding powder having an average particle size of 30 μm.

A 200-liter stainless steel granulation tank with a stirrer was charged with 130 liters of water and 30 kg of the PTFE molding powder. The rotation speed of the stirrer was set at 400 rpm and an inside temperature of the tank was adjusted to 25° to 30° C. Then the mixture was stirred for five minutes. Further 13.1 liters of dichloromethane was added thereto, followed by stirring for five minutes under the conditions mentioned above. Then a product in the granulation tank was subjected to 15-minute external circulation of being passed through a T.K. Pipe Line Homomixer Model 2SL and then returned to the granulation tank. During the external circulation of the rough pulverization, the stirring was continued. Then the stirring was carried out for 15 minutes under the above-mentioned temperature conditions for further shaping. After the shaping, the inside temperature of the tank was elevated to 45° C. over 20 minutes.

Then the product in the tank was taken out and dried at 165° C. for 16 hours in an electric oven. Physical properties of the PTFE molding powder so-obtained by the agglomeration granulation are shown in Table 3.

COMPARATIVE EXAMPLE 5

The roughly pulverized PTFE particles (No. 4) prepared in Reference Example 4 which contained 80% by weight of water were washed and dried in the same manner and under the same conditions as in Example 1. An average particle size of the thus obtained roughly pulverized PTFE particles was 300 μm.

The roughly pulverized PTFE particles were finely dry-pulverized into particles with Palpelyzer Model AP-44 under the conditions of a peripheral speed of 75 m/hour, a power of 35 kW and a pulverizing rate of 100 kg/hour to give a PTFE molding powder having an average particle size of 26 μm.

A 200-liter SUS granulation tank with a stirrer was charged with 130 liters of water and 30 kg of the PTFE molding powder. The rotation speed of the stirrer was set at 400 rpm and an inside temperature of the tank was adjusted to 25° to 30° C. Then the mixture was stirred for five minutes. Further 13.1 liters of dichloromethane was added thereto, followed by stirring for five minutes under the conditions mentioned above. Then a product in the granulation tank was subjected to 15-minute external circulation of being passed through a T.K. Pipe Line Homomixer Model 2SL and then returned to the granulation tank. During the external circulation of the rough pulverization, the stirring was continued. Then the stirring was carried out for 15 minutes under the above-mentioned temperature conditions for further shaping. After the shaping, the inside temperature of the tank was elevated to 45° C. over 20 minutes.

Then the product in the tank was taken out and dried at 165° C. for 16 hours in an electric oven. Physical properties of the PTFE molding powder so-obtained by the agglomeration granulation are shown in Table 3.

EXAMPLE 7

After pulverizing and washing in the same procedures as in Example 1, there remained 30 kg of washed PTFE powder having a water content of 25% by weight in the washing tank from which washing water had been discharged. The washing tank in which the washed PTFE wet powder remained was charged with 130 liters of water. The rotation speed of the stirrer was set at 400 rpm and the inside temperature of the tank was adjusted to 20° to 25° C. Then the mixture was stirred for five minutes. Further 15.7 liters of dichloromethane was added thereto, followed by stirring for five minutes under the conditions mentioned above. Then a product in the washing tank was subjected to 15-minute external circulation of being passed through a T.K. Pipe Line Homomixer Model 2SL and then returned to the washing tank. During the external circulation of the rough pulverization, the stirring was continued. Then the stirring was carried out for 15 minutes under the above-mentioned temperature conditions for further shaping. After the shaping, the inside temperature of the tank was elevated to 38° C. over 20 minutes.

Then the product in the tank was taken out and dried at 165° C. for 16 hours in an electric oven. Physical properties of the PTFE molding powder so-obtained by the agglomeration granulation are shown in Table 3.

EXAMPLE 8

After pulverizing and washing in the same procedures as in Example 2, there remained 30 kg of washed PTFE powder having a water content of 10% by weight in the washing tank from which washing water had been discharged. The washing tank in which the washed PTFE wet powder remained was charged with 130 liters of water. The rotation speed of the stirrer was set at 400 rpm and the inside temperature of the tank was adjusted to 20° to 25° C. Then the mixture was stirred for five minutes. Further 13.5 liters of dichloromethane was added thereto, followed by stirring for five minutes under the conditions mentioned above. Then a product in the washing tank was subjected to 15-minute external circulation of being passed through a T.K. Pipe Line Homomixer Model 2SL and then returned to the washing tank. During the external circulation of the rough pulverization, the stirring was continued. Then the stirring was carried out for 15 minutes under the above-mentioned temperature conditions for further shaping. After the shaping, the inside temperature of the tank was elevated to 38° C. over 20 minutes.

Then the product in the tank was taken out and dried at 165° C. for 16 hours in an electric oven. Physical properties of the PTFE molding powder so-obtained by the agglomeration granulation are shown in Table 3.

EXAMPLE 9

After pulverizing and washing in the same procedures as in Example 3, there remained 30 kg of washed PTFE powder having a water content of 10% by weight in the washing tank from which washing water had been discharged. The washing tank in which the washed PTFE wet powder remained was charged with 130 liters of water. The rotation speed of the stirrer was set at 400 rpm and the inside temperature of the tank was adjusted to 20° to 25° C. Then the mixture was stirred for five minutes. Further 12.5 liters of dichloromethane was added thereto, followed by stirring for five minutes under the conditions mentioned above. Then a product in the washing tank was subjected to 15-minute external circulation of being passed through a T.K. Pipe Line Homomixer Model 2SL and then returned to the washing tank. During the external circulation of the rough pulverization, the stirring was continued. Then the stirring was carried out for 15 minutes under the above-mentioned temperature conditions for further shaping. After the shaping, the inside temperature of the tank was elevated to 38° C. over 20 minutes.

Then the product in the tank was taken out and dried at 165° C. for 16 hours in an electric oven. Physical properties of the PTFE molding powder so-obtained by the agglomeration granulation are shown in Table 3.

EXAMPLE 10

After pulverizing and washing in the same procedures as in Example 4, there remained 30 kg of washed PTFE powder having a water content of 20% by weight in the washing tank from which washing water had been discharged. The washing tank in which the washed PTFE wet powder remained was charged with 130 liters of water. The rotation speed of the stirrer was set at 400 rpm and the inside temperature of the tank was adjusted to 20° to 25° C. Then the mixture was stirred for five minutes. Further 11.7 liters of dichloromethane was added thereto, followed by stirring for five minutes under the conditions mentioned above. Then a product in the washing tank was subjected to 15-minute external circulation of being passed through a T.K. Pipe Line Homomixer Model 2SL and then returned to the washing tank. During the external circulation of the rough pulverization, the stirring was continued. Then the stirring was carried out for 15 minutes under the above-mentioned temperature conditions for further shaping. After the shaping, the inside temperature of the tank was elevated to 38° C. over 20 minutes.

Then the product in the tank was taken out and dried at 165° C. for 16 hours in an electric oven. Physical properties of the PTFE molding powder so-obtained by the agglomeration granulation are shown in Table 3.

EXAMPLE 11

After pulverizing and washing in the same procedures as in Example 5, there remained 30 kg of washed PTFE powder having a water content of 15% by weight in the washing tank from which washing water had been discharged. The washing tank in which the washed PTFE wet powder remained was charged with 130 liters of water. The rotation speed of the stirrer was set at 400 rpm and the inside temperature of the tank was adjusted to 20° to 25° C. Then the mixture was stirred for five minutes. Further 11.7 liters of dichloromethane was added thereto, followed by stirring for five minutes under the conditions mentioned above. Then a product in the washing tank was subjected to 15-minute external circulation of being passed through a T.K. Pipe Line Homomixer Model 2SL and then returned to the washing tank. During the external circulation of the rough pulverization, the stirring was continued. Then the stirring was carried out for 15 minutes under the above-mentioned temperature conditions for further shaping. After the shaping, the inside temperature of the tank was elevated to 38° C. over 20 minutes.

Then the product in the tank was taken out and dried at 165° C. for 16 hours in an electric oven. Physical properties of the PTFE molding powder so-obtained by the agglomeration granulation are shown in Table 3.

the same manner as in Example 2, respectively. Then Z values were measured in the same manner as in Example 12. The results are shown in Table 4.

EXAMPLE 14

Each of finely pulverized PTFE particles obtained in the first, second and third washings in Example 3 was dried in the same manner as in Example 3, respectively. Then Z values were measured in the same manner as in Example 12. The results are shown in Table 4.

EXAMPLE 15

Each of finely pulverized PTFE particles obtained in the first, second and third washings in Example 4 was dried in the same manner as in Example 4, respectively. Then Z values were measured in the same manner as in Example 12. The results are shown in Table 4.

EXAMPLE 16

Each of finely pulverized PTFE particles obtained in the first, second and third washings in Example 5 was dried in

TABLE 3

| | Kind of particle used | Apparent specific gravity | Flowability of powder (times) | Tensile strength (kg/cm$^2$) | Elongation (%) | Electrostatic breakdown voltage (kV) | Average particle size after agglomeration granulation (μm) |
|---|---|---|---|---|---|---|---|
| Ex. 7 | Finely pulverized PTFE particles after washing in Ex. 1 | 0.74 | 8.0 | 422 | 360 | 9.2 | 400 |
| EX. 8 | Finely pulverized PTFE particles after washing in Ex. 2 | 0.81 | 8.0 | 418 | 367 | 8.6 | 410 |
| EX. 9 | Finely pulverized PTFE particles after washing in Ex.3 | 0.86 | 8.0 | 389 | 330 | 4.6 | 420 |
| EX. 10 | Finely pulverized PTFE particles after washing in Ex. 4 | 0.80 | 8.0 | 318 | 336 | 6.3 | 550 |
| Ex. 11 | Finely pulverized PTFE particles after washing in Ex. 5 | 0.83 | 8.0 | 367 | 395 | 12.0 | 650 |
| Com. Ex. 2 | Finely pulverized PTFE particle No. 1 after fine dry-pulverization | 0.80 | 8.0 | 450 | 350 | 6.5 | 520 |
| Com. Ex. 3 | Finely pulverized PTFE particle No. 2 after fine dry-pulverization | 0.85 | 8.0 | 350 | 280 | 2.5 | 600 |
| Com. Ex. 4 | Finely pulverized PTFE particle No. 3 after fine dry-pulverization | 0.83 | 8.0 | 385 | 332 | 12.0 | 350 |
| Com. Ex. 5 | Finely pulverized PTFE particle No. 1 after fine dry-pulverization | 0.83 | 8.0 | 393 | 415 | 12.7 | 550 |

EXAMPLE 12

Each of finely pulverized PTFE particles obtained in the first, second and third washings in Example 1 was dried in the same manner as in Example 1, respectively. Then Z values (coloring) thereof were measured in the following manner.

Z value: Finely pulverized PTFE particles of 200 g were molded into a 500 mm outer dia×500 mm long cylindrical article under a pre-molding pressure of 500 kg-f/cm$^2$ by baking at 365° C. for one hour. Then the molded article was cut crosswise at a part of about 250 mm length (around the center) with a lathe, and the Z value of the XYZ system at a center of the cut portion was measured according to the Z value measuring method of Commission International de Leclairage.

The results are shown in Table 4.

EXAMPLE 13

Each of finely pulverized PTFE particles obtained in the first, second and third washings in Example 2 was dried in the same manner as in Example 5, respectively. Then Z values were measured in the same manner as in Example 12. An amount of perfluoro(propyl vinyl ether) monomer remaining in the finely pulverized PTFE particles (hereinafter referred to as "remaining VE monomer") was analyzed in the same manner as in Example 5. The results are shown in Table 4.

COMPARATIVE EXAMPLE 6

Each of roughly pulverized PTFE particles obtained in the first, second and third washings in Comparative Example 1 was dried in the same manner as in Comparative Example 1, respectively. Then Z values were measured in the same manner as in Example 12. The results are shown in Table 4.

COMPARATIVE EXAMPLE 7

Each of roughly pulverized PTFE particles obtained in the first, second and third washings in Comparative Example 2 was dried in the same manner as in Comparative Example 1, respectively. Then Z values were measured in the same manner as in Example 12. The results are shown in Table 4.

COMPARATIVE EXAMPLE 8

Each of roughly pulverized PTFE particles obtained in the first, second and third washings in Comparative Example 3 was dried and finely dry-pulverized into particles in the same manner as in Comparative Example 1, respectively. Then Z values were measured in the same manner as in Example 12. The results are shown in Table 4.

COMPARATIVE EXAMPLE 9

Each of roughly pulverized PTFE particles obtained in the first, second and third washings in Comparative Example 4 was dried and finely dry-pulverized into particles in the same manner as in Comparative Example 1, respectively. Then Z values were measured in the same manner as in Example 12. An amount of remaining VE monomer in the finely dry-pulverized PTFE particles was analyzed in the same manner as in Example 5. The results are shown in Table 4.

COMPARATIVE EXAMPLE 10

Each of roughly pulverized PTFE particles obtained in the first, second and third washings in Comparative Example 5 was dried and finely dry-pulverized into particles in the same manner as in Comparative Example 1, respectively. Then Z values were measured in the same manner as in Example 12. An amount of remaining VE monomer in the finely dry-pulverized PTFE particles was analyzed in the same manner as in Example 5. The results are shown in Table 4.

TABLE 4

| | Z value of every washing | | | Amount of remaining VE monomer of every washing (ppm) | | |
|---|---|---|---|---|---|---|
| | First | Second | Third | First | Second | Third |
| Ex. 12 | 106 | 107 | 107 | — | — | — |
| Ex. 13 | 106 | 107 | 106 | — | — | — |
| Ex. 14 | 107 | 107 | 108 | — | — | — |
| Ex. 15 | 106 | 107 | 107 | — | — | — |
| Ex. 16 | 90 | 91 | 91 | 15 | 1.5 | 0.7 |
| Com. Ex. 6 | 80 | 88 | 91 | — | — | — |
| Com. Ex. 7 | 99 | 102 | 104 | — | — | — |
| Com. Ex. 8 | 98 | 103 | 105 | — | — | — |
| Com. Ex. 9 | 80 | 87 | 89 | 30 | 10 | 8.1 |
| Com. EX. 10 | 79 | 87 | 90 | 32 | 9 | 8 |

INDUSTRIAL APPLICABILITY

According to the preparation process of the present invention, by finely pulverizing, in wet state, PTFE coarse particles obtained by suspension polymerization, finely pulverized particles can be washed as they are, and an amount of impurities such as unreacted monomer and initiator remaining in the finely pulverized particles can be reduced efficiently.

Also according to the preparation process of the present invention, by agglomeration granulation after the above-mentioned washing, PTFE molding powders can be obtained in the reduced number of steps.

What is claimed is:

1. A process for preparing a polytetrafluoroethylene molding powder, characterized in that polytetrafluoroethylene coarse particles obtained by suspension polymerization of tetrafluoroethylene are finely pulverized in a wet state with a water content of about 25% by weight or less into particles having an average particle size in a range of 10 to 100 $\mu$m and the finely pulverized particles are then washed and dried to form the polytetrafluoroethylene molding powder.

2. The process for preparing the polytetrafluoroethylene molding powder of claim 1, characterized in that polytetrafluoroethylene coarse particles are subjected to fine pulverization to give particles having an average particle size in a range of 20 to 50 $\mu$m.

3. The process for preparing the polytetrafluoroethylene molding powder of claim 1, characterized in that polytetrafluoroethylene coarse particles are, before the fine pulverization, roughly pulverized previously into particles having an average particle size in a range of 200 to 1,000 $\mu$m.

4. The process for preparing the polytetrafluoroethylene molding powder of claim 1, characterized in that said pulverization is conducted with a pulverizing machine which pulverizes with impact force.

5. The process for preparing the polytetrafluoroethylene molding powder of claim 4, characterized in that said pulverization is conducted continuously with a pulverizing machine which is equipped with a pulverization chamber having a rotating hammer; means to supply the powder continuously into said chamber; and a perforated plate surrounding said pulverization chamber and provided in a peripheral direction of the rotating hammer and has a system of classifying the particles with the perforated plate when the particles pulverized with impact force in said pulverization chamber are scattered outward with centrifugal force.

6. A process for preparing a polytetrafluoroethylene molding powder, characterized in that polytetrafluoroethylene coarse particles obtained by suspension polymerization of tetrafluoroethylene are finely pulverized in a wet state into particles having an average particle size in a range of 10 to 100 $\mu$m, the finely pulverized particles are then washed and granulated through agglomeration, and the granulated particles are dried to form the polytetrafluoroethylene molding powder.

7. The process for preparing the polytetrafluoroethylene molding powder of claim 6, characterized in that the washing and agglomeration granulation are conducted in a single tank continuously.

8. The process for preparing the polytetrafluoroethylene molding powder of claim 1, characterized in that said polytetrafluoroethylene is a vinyl ether-modified polytetrafluoroethylene obtained by copolymerizing 99.999 to 99.8% by mole of tetrafluoroethylene with 0.001 to 0.2% by mole of a vinyl ether monomer represented by the formula (I):

$$CF_2=CF-X \qquad (I)$$

wherein X is $OR_f$ ($R_f$ is a polyfluoroalkyl group having 1 to 5 carbon atoms).

9. The process for preparing the polytetrafluoroethylene molding powder of claim 2, characterized in that polytetrafluoroethylene coarse particles are, before the fine pulverization, roughly pulverized previously into particles having an average particle size in a range of 200 to 1,000 $\mu$m.

10. The process for preparing the polytetrafluoroethylene molding powder of claim 2, characterized in that said pulverization is conducted with a pulverizing machine which pulverizes with impact force.

11. The process for preparing the polytetrafluoroethylene molding powder of claim 6, characterized in that polytetrafluoroethylene coarse particles are subjected to fine pulverization to give particles having an average particle size in a range of 20 to 50 μm.

12. The process for preparing the polytetrafluoroethylene molding powder of claim 11, characterized in that the washing and agglomeration granulation are conducted in a single tank continuously.

13. The process for preparing the polytetrafluoroethylene molding powder of claim 6, characterized in that said pulverization is conducted with a pulverizing machine which pulverizes with impact force.

14. The process for preparing the polytetrafluoroethylene molding powder of claim 13, characterized in that said pulverization is conducted with a pulverizing machine which is equipped with a pulverization chamber having a rotating hammer; means to supply the powder continuously into said chamber; and a perforated plate surrounding said pulverization chamber and provided in a peripheral direction of the rotating hammer and has a system of classifying the particles with the perforated plate when the particles pulverized with impact force in said pulverization chamber are scattered outward with centrifugal force.

15. The process for preparing the polytetrafluoroethylene molding powder of claim 6, characterized in that said polytetrafluoroethylene is a vinyl ether-modified polytetrafluoroethylene obtained by copolymerizing 99.999 to 99.8% by mole of tetrafluoroethylene with 0.001 to 0.2% by mole of a vinyl ether monomer represented by the formula (I):

$$CF_2=CF-X \qquad (I)$$

wherein X is $OR_f$ ($R_f$ is a polyfluoroalkyl group having 1 to 5 carbon atoms).

16. A process for preparing a polytetrafluoroethylene molding powder, characterized in that polytetrafluoroethylene coarse particles obtained by suspension polymerization of tetrafluoroethylene are roughly pulverized previously into particles having an average particle size in a range of 200 to 1,000 μm, followed by finely pulverizing in a wet state into particles having an average particle size in a range of 10 to 100 μm and the finely pulverized particles are then washed and dried to form the polytetrafluoroethylene molding powder.

17. The process for preparing the polytetrafluoroethylene molding powder of claim 16, characterized in that said roughly pulverized polytetrafluoroethylene particles are subjected to fine pulverization to give particles having an average particle size in a range of 20 to 50 μm.

18. The process for preparing the polytetrafluoroethylene molding powder of claim 16, characterized in that said fine pulverization is conducted with a pulverizing machine which pulverizes with impact force.

19. The process for preparing the polytetrafluoroethylene molding powder of claim 18, characterized in that said fine pulverization is conducted continuously with a pulverizing machine which is equipped with a pulverization chamber having a rotating hammer; means to supply the powder continuously into said chamber; and a perforated plate surrounding said pulverization chamber and provided in a peripheral direction of the rotating hammer and has a system of classifying the particles with the perforated plate when the particles pulverized with impact force in said pulverization chamber are scattered outward with centrifugal force.

20. The process for preparing the polytetrafluoroethylene molding powder of claim 16, characterized in that said polytetrafluoroethylene is a vinyl ether-modified polytetrafluoroethylene obtained by copolymerizing 99.999 to 99.8% by mole of tetrafluoroethylene with 0.001 to 0.2% by mole of a vinyl ether monomer represented by the formula (I):

$$CF_2=CF-X \qquad (I)$$

wherein X is $OR_f$ and $R_f$ is a polyfluoroalkyl group having 1 to 5 carbon atoms.

21. The process for preparing the polytetrafluoroethylene molding powder of claim 17, characterized in that said fine pulverization is conducted with a pulverizing machine which pulverizes with impact force.

22. The process for preparing the polytetrafluoroethylene molding powder of claim 1, characterized in that the washing is carried out until a Z value of the powder reaches to 90 or more.

\* \* \* \* \*